United States Patent
McKown

(10) Patent No.: US 8,175,068 B2
(45) Date of Patent: May 8, 2012

(54) ACTIVE SPREAD CODE DETECTION

(75) Inventor: Russell McKown, Richardson, TX (US)

(73) Assignee: Advanced Receiver Technologies, LLC, Dallas, TX (US)

( * ) Notice: Subject to any disclaimer, the term of this patent is extended or adjusted under 35 U.S.C. 154(b) by 986 days.

(21) Appl. No.: 12/079,397

(22) Filed: Mar. 26, 2008

(65) Prior Publication Data

US 2009/0245219 A1    Oct. 1, 2009

(51) Int. Cl.
*H04B 7/216* (2006.01)
*H04B 1/00* (2006.01)

(52) U.S. Cl. .................. 370/342; 370/335; 375/147

(58) Field of Classification Search .......... 370/203, 370/208, 209, 335, 342, 441, 479
See application file for complete search history.

(56) References Cited

U.S. PATENT DOCUMENTS

| | | | | |
|---|---|---|---|---|
| 5,327,467 A * | 7/1994 | De Gaudenzi et al. | ........ | 375/356 |
| 6,167,037 A * | 12/2000 | Higuchi et al. | ........ | 370/335 |
| 7,023,872 B2 * | 4/2006 | Shanbhag | ........ | 370/441 |
| 7,257,077 B2 * | 8/2007 | Nitsch | ........ | 370/203 |
| 7,577,120 B2 * | 8/2009 | Hu et al. | ........ | 370/335 |
| 2002/0051433 A1 | 5/2002 | Affes et al. | | |
| 2002/0160813 A1 * | 10/2002 | Miya | ........ | 455/562 |
| 2003/0063586 A1 * | 4/2003 | Engholm et al. | ........ | 370/335 |
| 2003/0165131 A1 | 9/2003 | Liang et al. | | |
| 2003/0223489 A1 | 12/2003 | Smee et al. | | |
| 2004/0156426 A1 * | 8/2004 | Motoyoshi et al. | ........ | 375/150 |
| 2004/0179550 A1 * | 9/2004 | Naka et al. | ........ | 370/479 |
| 2004/0213173 A1 * | 10/2004 | Franke | ........ | 370/320 |
| 2004/0228314 A1 * | 11/2004 | Ros et al. | ........ | 370/342 |
| 2005/0122894 A1 * | 6/2005 | Lucidarme et al. | ........ | 370/208 |
| 2005/0232343 A1 * | 10/2005 | Sakai et al. | ........ | 375/152 |
| 2007/0061642 A1 * | 3/2007 | Currivan et al. | ........ | 714/724 |
| 2008/0298488 A1 * | 12/2008 | Shen et al. | ........ | 375/260 |
| 2009/0016412 A1 * | 1/2009 | Okamoto | ........ | 375/146 |

* cited by examiner

Primary Examiner — Warner Wong

(57) ABSTRACT

A System, method and computer readable medium for determining an active code set comprises determining code detection statistics for corresponding spread code indices, sorting the determined code detection statistics and the corresponding spread code indices according to amplitudes of the code detection statistics, and determining an active code set based on the sorted code detection statistics and the corresponding sorted spread code indices.

9 Claims, 10 Drawing Sheets

ACTIVE SPREAD CODE DETECTION

CROSS-REFERENCE TO RELATED APPLICATIONS

The present patent application is related to U.S. Provisional Patent Application 60/628,248 filed on Nov. 16, 2004, entitled Chip-Level No-Decision Feedback Equalizer For CDMA Wireless Systems, U.S. patent application Ser. No. 11/280,858 filed on Nov. 16, 2005, entitled Chip-Level No-Decision Feedback Equalizer For CDMA Wireless Systems, U.S. patent application Ser. No. 10/796,596 filed on Mar. 9, 2004, entitled Methods and Apparatus For Single Burst Equalization of Single Carrier Signals In Broadband Wireless Access Systems, and U.S. patent application Ser. No. 11/900,343 filed on Sep. 6, 2007, entitled "Method and Apparatus for Efficient Channel Estimate Based Timing Recovery", the contents of each of which are incorporated by reference herein.

BACKGROUND OF INVENTION

In Code Division Multiple Access (CDMA) communication systems, multiple data channels are provided by spreading the data of individual users with unique spread codes. Traditionally, the elements that are communicated on the data channels are referred to as 'symbols' and the elements of the spread codes are referred to as 'chips'. An example of such a CDMA signal is the Wideband Code Division Multiple Access (WCDMA) signal specified by the $3^{rd}$ Generation Partnership Project (3GPP) standards organization. Other examples for mobile wireless networks are the CDMA2000 family of signals and the TD-SCDMA signals contained in these two alternative CDMA technologies. These standardized CDMA technologies provide third generation (3G) mobile voice/phone and internet/data service to a growing number of wireless subscribers/users around the world.

At the CDMA signal transmitter, a CDMA signal for multiple channel transmission can be created by summing different spread code channel signals. These individual code channel signals are created by modulating a selected spread code sequence with a symbol from an assigned user data channel. At the CDMA signal receiver, knowledge of the spread code used at the transmitter is required so that the receiver can extract the data/symbol of interest to the user. This code knowledge is provided to the user's receiver, for example, as part of the network-subscriber link acquisition procedure. Under ideal radio wave propagation conditions, the performance of the CDMA receiver for an individual user data channel does not benefit from knowing the spread codes that are simultaneously being used on channels that have been assigned to other users.

Under realistic, non-ideal radio wave propagation conditions and in the real world environment of multiple base station networks, the multiple user/multiple base station CDMA signals interfere with each other such that the performance of traditional, 'assigned code only' receivers, can be severely degraded. An example of an 'assigned code only' receiver is a code-matched, channel-matched filter receiver which is also known as the implementation of a 'Rake' receiver which is well known in the art. When used for the downlink receiver in a subscriber handset, the Rake receiver displays performance degradation with increasing levels of intracellular and/or intercellular interference.

Intracellular interference refers to the multiple user interference within a single-base-station cell that arises due to multiple propagation path (multipath) distortion of the radio signal. Multipath distortion causes the spread codes associated with multiple code channels to loose their mathematical property of orthogonality. This loss of spread code orthogonality due to multipath results in a performance degradation of the legacy 'assigned code only' Rake receiver. This performance degradation is sufficiently severe to make the use of the Rake receiver undesirable for 3G networks designed to provide mobile wireless broadband service to multiple users. An 'equalizer receiver' is based on a signal-estimation filter that approximately corrects the multipath distortion and approximately restores the orthogonality property of the multiple spread code signals that are contained in the received CDMA signal. An 'assigned code only' despreading operation will then provide a high performance detection of the symbols that are of interest to the user, even in propagation environments that contain significant multipath-derived intracellular interference.

Intercellular interference refers to the multiple base station interference that arises whenever the subscriber's received signal contains signals originating from two or more base stations transmitting on the same radio frequency. The topology and the frequency usage of the 3G CDMA networks results in intracellular interference being a significant factor in a large amount of the cell coverage area. Both the legacy Rake receiver and the equalizer receiver are sensitive to intercellular interference and incur significant performance degradation when it is present.

More complicated, 'advanced receivers', that can mitigate the effects of intercellular interference for real world multiple user/multiple base station CDMA networks, include techniques that address intercellular interference such as 'interference suppression by means of projection', for example U. Madhow and M. L. Honig, *MMSE Interference Suppression for Direct-Sequence Spread-Spectrum CDMA*, IEEE Transactions on Communications, Vol. 42, No. 12, pp. 3178-3188, December 1994, and techniques that perform interference cancellation where interfering signals are estimated and subtracted. For examples of the latter type of advanced receiver see A. Bastug and D. Slock, *Interference Canceling Receivers with Global MMSE—Zero Forcing Structure and Local MMSE Operations*, Proc. Asilomar Conf. on Signals, Systems & Computers, November 2003.

A practical problem that arises in the implementation of interference cancellation receivers is active spread code detection, i.e., the identification of what spread codes are being used in the CDMA signals. Knowledge of the active spread codes is required to estimate the interfering CDMA signals so that they can be subtracted off. Another benefit of determining the complete set of active codes in a CDMA signal is that it allows a higher performance estimation of the propagation channel impulse response. Improving the quality of the channel estimate improves receiver performance by improving the processing that compensates for the multipath channel distortion, e.g., improved channel equalization.

Although knowledge of all active spread codes is beneficial to the implementation of advanced receivers for CDMA signals, it is standard practice for the CDMA network to give the individual user's receiver knowledge of only the spread code or codes assigned to that user. What is desired is a system and method that allows the individual user's receiver to determine the complete set of active spread codes associated with each CDMA signal that is strong enough to be received/interfere.

SUMMARY OF INVENTION

The present invention provides a system and method for active spread code detection and more specifically to an efficient detection of the active spread codes contained in a CDMA signal.

In one embodiment, a method for determining an active code set comprises determining code detection statistics for corresponding spread code indices, sorting the determined code detection statistics and the corresponding spread code indices according to amplitudes of the code detection statistics, and determining an active code set based on the sorted code detection statistics and the corresponding sorted spread code indices.

In one embodiment, a method for determining an active code set comprises (a) receiving code detection statistics and the corresponding spread code indices according to amplitudes of the code detection statistics, wherein the amplitudes of the code detection statistics monotonically increase with the probability that a spread code channel is active, (b) determining an activity threshold based on the received code detection statistics, (c) testing the code detection statistics and the corresponding spread code indices in descending order based on the amplitudes of the code detection statistics, the testing comprising: (i) placing a test spread code index, of the spread code indices being tested, in a spread code index active set when a value of the code detection statistic corresponding to the spread code index is greater than the activity threshold, (ii) removing a parent code index of the test spread code index from the spread code index active set when the parent code index is in the spread code index active set, (iii) removing the test spread code index from the spread code index active set when a child code index of the test spread code index is in the spread code index active set, (iv) performing steps (i) through (iii) until the value of the code detection statistic is not greater than the activity threshold, and (d) outputting the spread code index active set based on the testing.

In one embodiment, an active code detection module for determining an active code set comprises a module that tests code detection statistics and corresponding spread code indices in descending order based on amplitudes of the code detection statistics, wherein the tests: place a test spread code index, of the spread code indices being tested, in a spread code index active set when a value of the code detection statistic corresponding to the spread code index is greater than an activity threshold, remove a parent code index of the test spread code index from the spread code index active set when the parent code index is in the spread code index active set, and remove the test spread code index from the spread code index active set when a child code index of the test spread code index is in the spread code index active set.

In one embodiment, an active code detection module for determining an active code set comprises a first module that: receives symbol estimates from matched filters for spread code indices, and determines code detection statistics for corresponding ones of the spread code indices, and a second module that: sorts the determined code detection statistics and the corresponding spread code indices according to amplitudes, of the code detection statistics, that monotonically increase with the probability that a spread code channel is active, determines an active code set based on the sorted code detection statistics and the corresponding sorted spread code indices, and outputs the determined active code set.

DETAILED DESCRIPTION OF THE INVENTION

The present invention provides a module or system and a method of active spread code detection that can be used in a CDMA signal receiver. Sorted code detection statistic data form the basis of an iterative procedure of the present invention that provides a set of spread code indices identifying active spread codes. Each of the depicted and described modules of the present invention can be implemented in hardware, software or firmware or a combination thereof. The present invention is relevant to CDMA communication systems, for example to multi-rate CDMA communication systems where the spread codes used to channelize the individual user data streams are selected from an orthogonal variable spreading factor (OVSF) tree. For example, the Universal Mobile Telecommunications System (UMTS) family of network technical specifications includes the WCDMA, TD-CDMA, and TDS-CDMA designated air interfaces, all of which utilize the same OVSF code tree.

Figure 1:
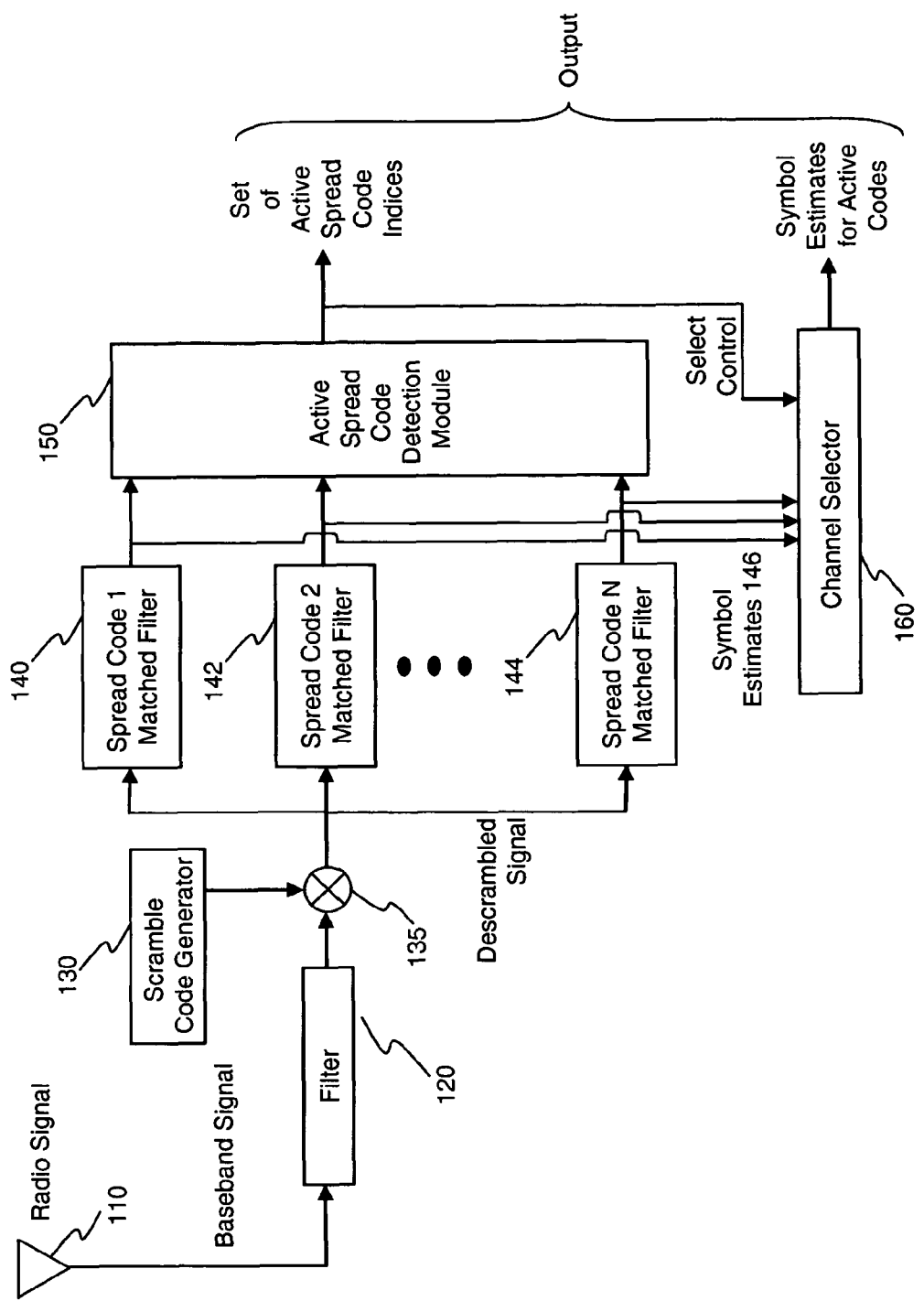
FIG. 1 depicts a block diagram of an example implementation of an active code detection system within a CDMA signal receiver.

FIG. 1 provides an example implementation of the active code detection module 150 within a CDMA signal receiver. The CDMA radio signal is received with an antenna 110 and down converted to a baseband signal as is well known and not shown. A chip-rate baseband signal processing filter 120 is applied to the baseband signal to provide compensation for the signal distortion created by multipath radio propagation channels. Examples of such filters are a channel-matched filter or a signal-estimation filter such as a minimum mean squared error (MMSE) filter. The filtered chip-rate signal can then be descrambled by multiplication 135 with a known scramble code that can be locally generated 130. This provides a descrambled chip-rate signal as input to a bank of N spread-code matched filters, 140 to 144, that output symbol estimates 146 for each spread code. The spread-code matched filters correspond to the available user data channels and are conveniently identified herein by spread code index, SCI=1 to N. The symbol estimates 146 from the bank of spread-code matched filters, 140 to 144, are input to both the active code detection module 150 and a channel selector 160. Once the active code detection module 150 has determined the set of active codes, this knowledge can be provided to the channel selector 160 so that it can select the active spread code channels and output the associated streams of symbol estimates from the active code channels. Finally, the set of active codes and the symbol estimates from the active code channels can be output for further processing not shown in FIG. 1, for example, symbol decoding and/or interference cancellation.

Figure 2:
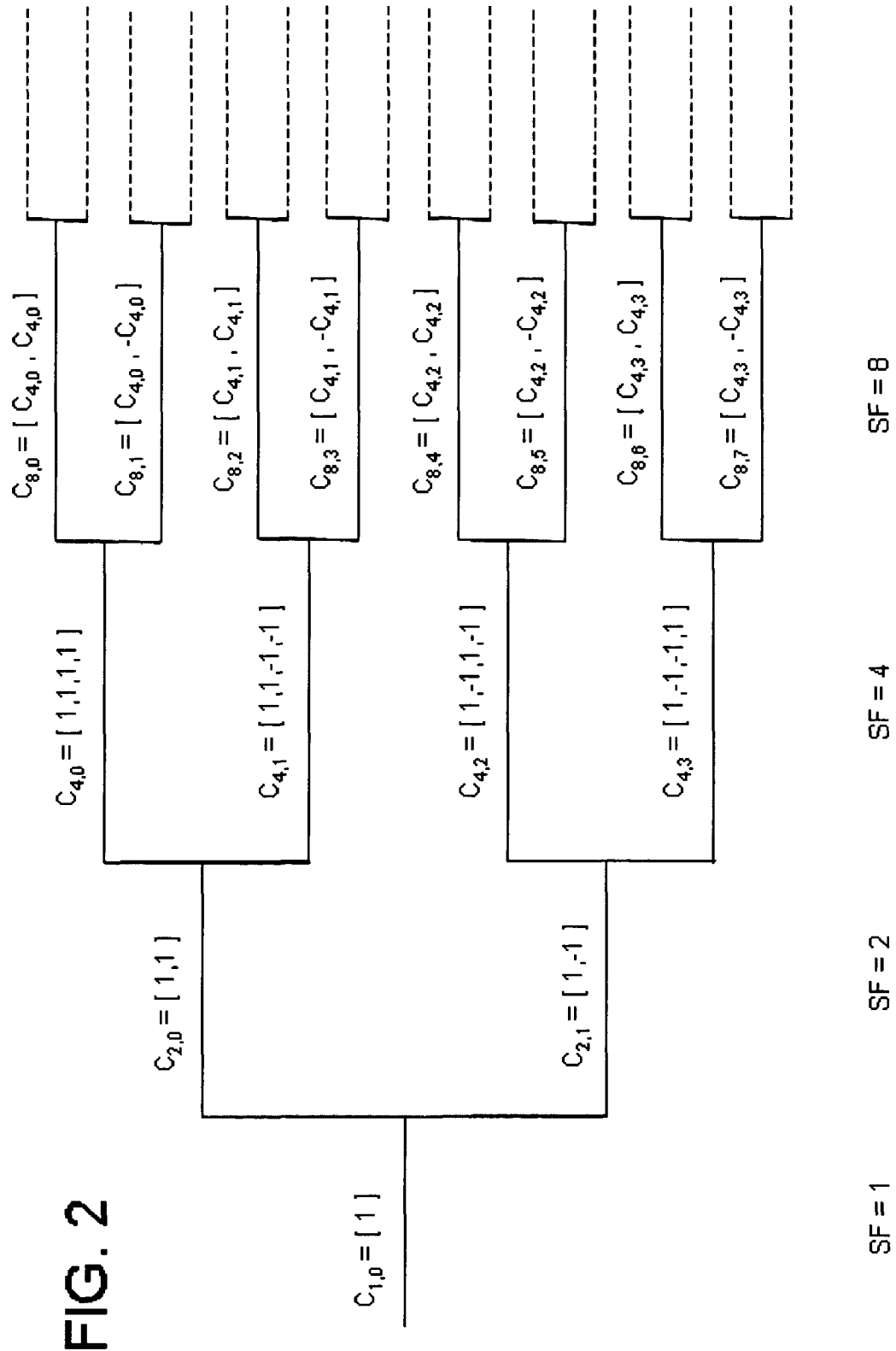
FIG. 2 depicts a reference example of a spread code tree as defined in certain CDMA air interfaces specifications.

FIG. 2 provides a reference example of the OVSF code tree used in the WCDMA, TD-CDMA, and TDS-CDMA UMTS air interfaces (see for example, *Technical Specification Group*

Radio Access Network: Spreading and Modulation (FDD), 3GPP TS 25.213 V5.5.0, 2003-12). The data channelization spread codes are uniquely described as $C_{SF,j}$ where SF is the spreading factor of the code and j is the code number, such that $0 \leq j \leq SF-1$. Each level in the OVSF code tree defines spread codes of length SF corresponding to a specific spreading factor $SF=2^L$ where $L=0, 1, 2, 3$, etc. The spread factor SF is equal to the CDMA signal's chip rate divided by the code channel's symbol rate. FIG. 2 illustrates the OVSF spread codes for SF=1, SF=2, SF=4 and SF=8. The spread codes of the OVSF tree, $C_{SF,j}$, can be generated as:

$C_{1,0}=1$,
$C_{2,0}=[1,1]=[C_{1,0},C_{1,0}]$
$C_{2,1}=[1,-1]=[C_{1,0},-C_{1,0}]$
$C_{4,0}=[1,1,1,1]=[C_{2,0},C_{2,0}]$
$C_{4,1}=[1,1,-1,-1]=[C_{2,0},-C_{2,0}]$
$C_{4,2}=[1,-1,1,-1]=[C_{2,1},C_{2,1}]$
$C_{4,3}=[1,-1,-1,1]=[C_{2,1},-C_{2,1}]$ and so on for continued doubling of the spread factor SF and expansion of the code number j range as SF increases, i.e., $j=0, 1, 2 \ldots SF-1$. The air interface specifications state the levels of the OVSF code tree that are available for data channel assignment by specifying the allowed spread factor range. For example, the WCDMA air interface provides that the allowed OVSF code usage is in the spread factor range $SF_{min} \leq SF \leq SF_{max}$, where $SF_{min}=4$ and $SF_{max}=512$.

Note that for the WCDMA air interface, if all of the spread codes that are available for data channel assignment are to be included in the bank of N spread code matched filters, 140 to 144 of FIG. 1, then $N=4+8+16+32+64+128+256+512=1020$. In practice this is not problematic for two reasons: 1) advanced receivers for WCDMA do not require active code detection for the higher values of the spread factor and 2) the fast Walsh Hadamard transformation provides efficient methods of computing the spread-code matched filter outputs for the OVSF codes.

It is evident from FIG. 2 and the above code generation formula that two OVSF codes at a given SF level, for example SF=4, are generated from each OVSF code at the 'previous' OVSF code tree level SF'=SF/2, which in this example is the SF'=2 level, e.g., both $C_{4,2}$ and $C_{4,3}$ are generated from $C_{2,1}$. It is useful to note this generational relationship between the codes by referring to the generated codes, e.g., codes $C_{4,2}$ and $C_{4,3}$, as 'children' with an individual generated code, e.g., code $C_{4,2}$, referred to a as a 'child' code. It is also useful to refer to the code from which the children codes are generated, e.g., $C_{2,1}$, as a 'parent' code. Furthermore, it is useful to refer to 'the parent code of a parent code' as simply a 'parent code' and to 'the children codes of children codes' as simply 'children codes' and similarly for additional generations of either parents or children. This terminology results in the term 'parent codes of a specific code' including all codes of lower SF value from which the specific code can be generated and the term 'children codes of a specific code' including all codes of higher SF that can be generated from the specific code.

A well known mathematical property of the OVSF code tree is that, by construction, specific codes are not orthogonal to either their parent codes or their children codes. This contrasts with the OVSF codes at a given SF defined code tree level which are all orthogonal with respect to each other. It also contrasts with the OVSF codes at different tree levels that are unrelated, i.e., have no parent codes in common, and which, as a result, are also orthogonal with respect to each other. The lack of orthogonality between the parent and children OVSF codes has the consequence that if a given code is assigned to be active, then none of the given code's parent codes or children codes are available for use. The present invention for a method of active spread code detection efficiently exploits this known 'code assignment blocking property' of the OVSF code tree.

Figure 3:
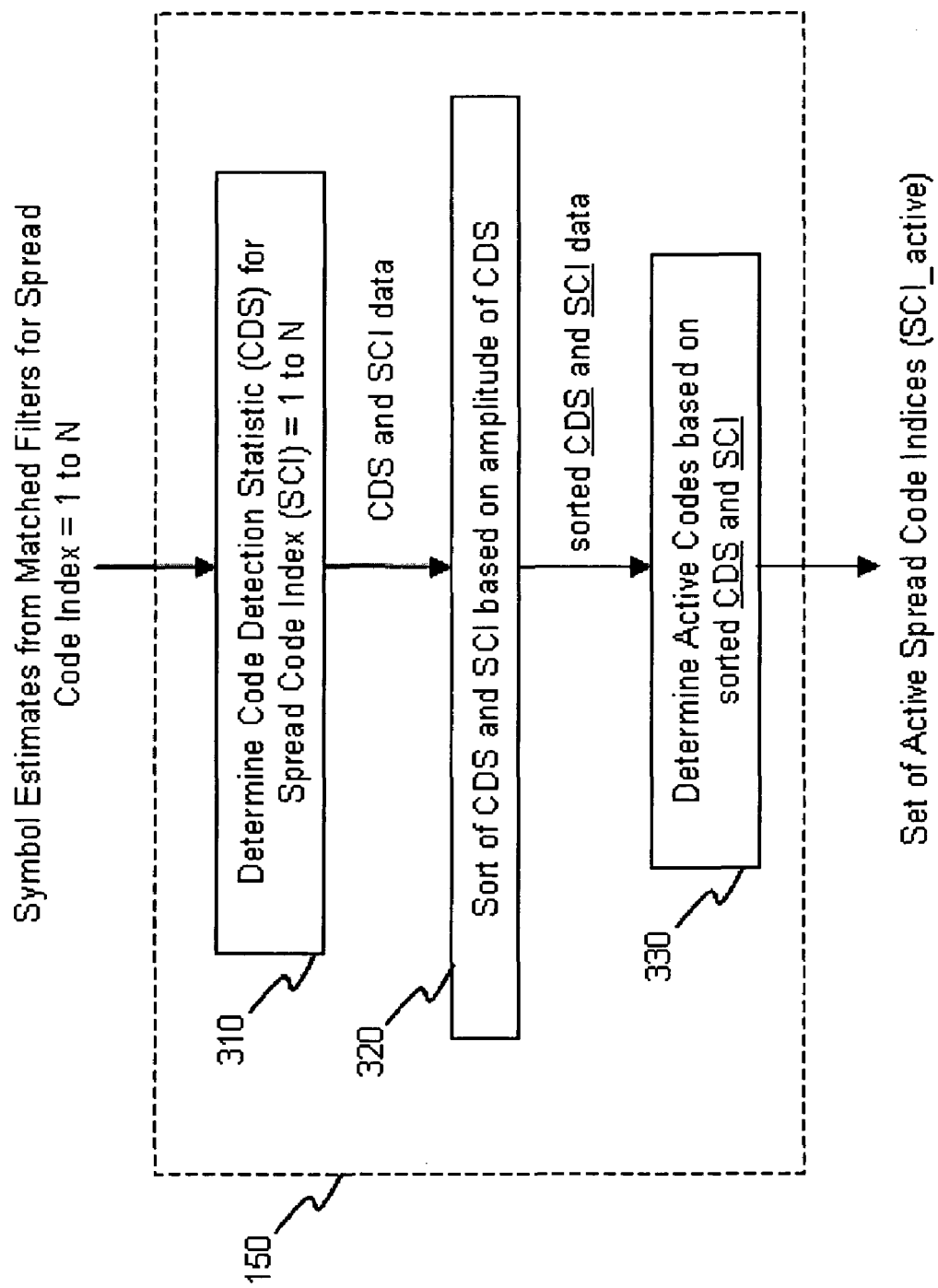
FIG. 3 depicts a first block diagram of an active spread code detection system in accordance to an embodiment of the present invention.

FIG. 3 shows a block diagram of certain processes performed by an implementation of the active spread code detection module 150 of the present invention. Module 310 determines a code detection statistic, CDS(k), for each of the $k=1$ to N spread-code matched filters, 140 to 144. To keep track of the spread codes, we define a spread code index, SCI(k), for each of the spread-code matched filters. The method of arranging filters and assigning the spread code index SCI does not matter in the present invention provided it is possible to identify the SCI that are parent codes and the SCI that are children codes with respect to each SCI(k). For example, one method of assigning the SCI to the OVSF spread codes, $C_{SF,j}$, is sequentially starting at 1 according to increasing j first and increasing SF second, for $j=0, 1, 2 \ldots SF-1$ and $SF=SF_{min}$, $2*SF_{min}$, $4*SF_{min} \ldots SF_{max}$. For this example and with $SF_{min}=4$, SCI=5 corresponds to OVSF code $C_{8,0}$ and SCI=14 corresponds to OVSF code $C_{16,1}$ which makes SCI=14 a child code with respect to SCI=5 and SCI=5 a parent code with respect to SCI=14.

A requirement of the code detection statistic, CDS(k), in the present invention is that it is statistically monotonically related to the probability that the associated spread code, identified by SCI(k), is active. In other words, the mean value of CDS(k) should monotonically increase with the probability that the spread code identified by SCI(k) is active for all $k=1$ to N. For example, the power of the symbol estimate outputs 146 of the spread-code matched filters can be used as a code detection statistic. In this case, $$CDS(k)=<\alpha(k)*\alpha(k)'>$$

where $\alpha(k)$ is a vector of complex symbols from the $k^{th}$ spread-code matched filter, and * denote conjugate transpose and vector dot product, respectively, and the brackets denote averaging.

Since the output of the spread-code matched filters includes noise, a better code detection statistic may be obtained by subtracting off an estimate of the power associated with this noise. It is standard terminology in wireless engineering to refer to the magnitude of the noise of a symbol estimate as the error vector magnitude (EVM). An example means of estimating the average EVM for the symbol estimate vector, $\alpha(k)$, is to form a vector of 'hard' symbol decision estimates, $\overline{\alpha}(k)$, where each element in $\overline{\alpha}(k)$ is equal to the symbol alphabet value that is nearest the corresponding element in $\alpha(k)$. The average EVM, <EVM>, for $\alpha(k)$ is determined as $$<EVM>=<|\alpha(k)-\overline{\alpha}(k)|>$$

and a corresponding noise power is $<EVM^2>=<|(k)-\overline{\alpha}(k)|^2>$. The associated improved code detection statistic of interest can then be written as $$CDS(k)=<\alpha(k)*\alpha(k)'>-<|\alpha(k)-\overline{\alpha}(k)|^2>.$$

The above estimates of the signal plus noise power, $<\alpha(k)*\alpha(k)'>$, and the noise power, $<|\alpha(k)-\overline{\alpha}(k)|^2>$, can also be ratioed to provide a signal-plus-noise-power to noise-power ratio at the output of the $k^{th}$ spread-code matched. To distinguish the code detection statistic defined by the power ratio it is referred to as CDSR(k), which can be written as $$CDSR(k) = \frac{<\alpha(k)*\alpha(k)'>}{<|\alpha(k)-\underline{\alpha}(k)|^2>}.$$

Referring to FIG. 3, the N code detection statistics, CDS (k), and the corresponding spread code indices, SCI(k), for k=1 to N are received by module 320 which sorts the CDS and corresponding SCI data based on the amplitude of the CDS data. According to the present invention, module 330 then receives the sorted CDS and SCI data, referred to here as $\overline{CDS}$ and $\overline{SCI}$ data, respectively, and determines the active spread codes. The output of module 330 is the set of spread code indices that identify the active spread codes. This set of active spread code indices is given the notation SCI_active.

In one embodiment, a method for determining an active code set comprises determining code detection statistics for corresponding spread code indices, sorting the determined code detection statistics and the corresponding spread code indices according to amplitudes of the code detection statistics, and determining an active code set based on the sorted code detection statistics and the corresponding sorted spread code indices. The method also comprises receiving symbol estimates from matched filters for the spread code indices prior to the determining of the code detection statistics for corresponding spread code indices and outputting the determined active code set, wherein the spread code indices=1 to N, wherein the amplitudes of the code detection statistics monotonically increase with the probability that a spread code channel is active, and wherein a Code Division Multiple Access (CDMA) signal utilizes the spread code channel.

Figure 4A:
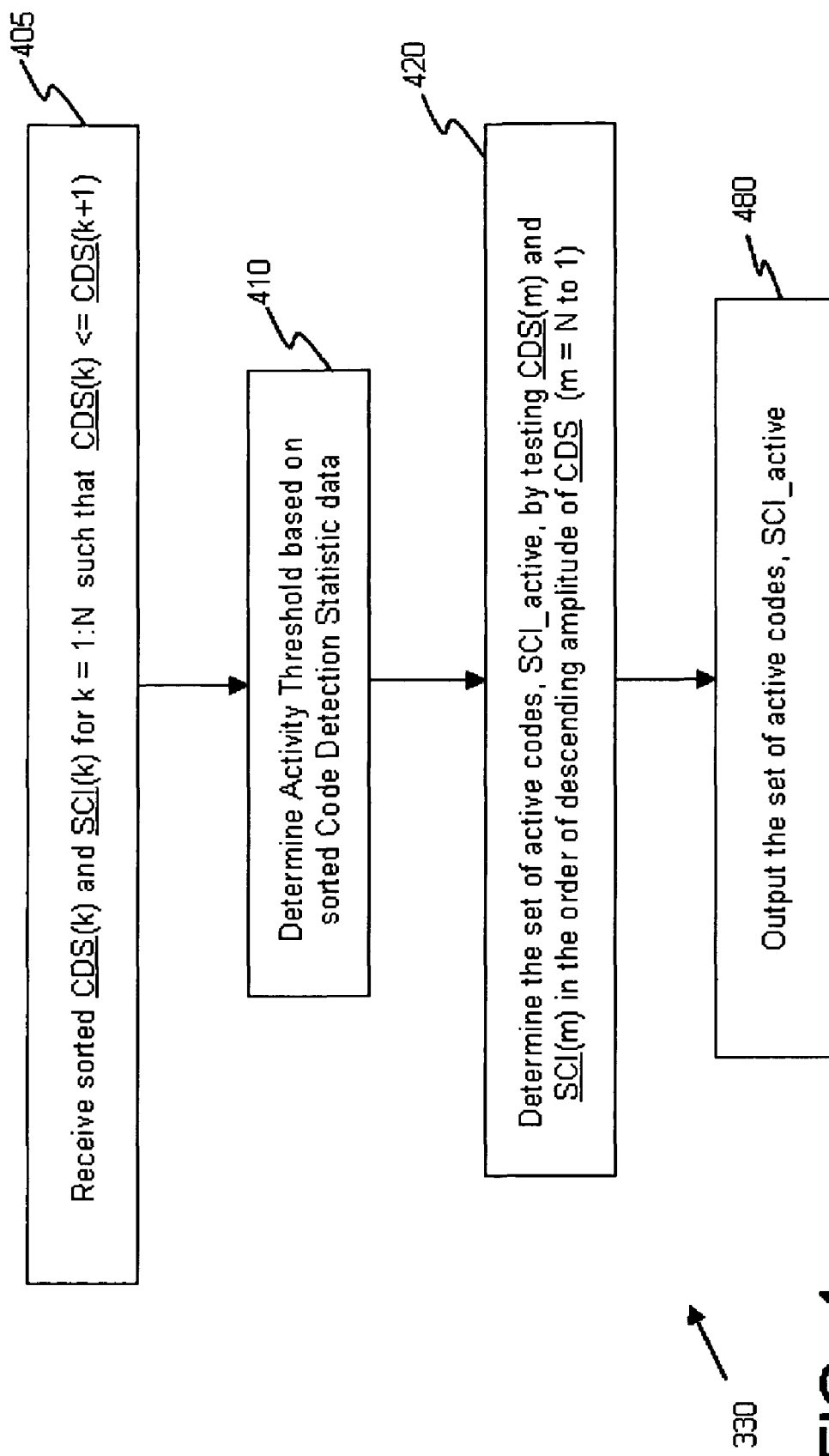
FIG. 4 depicts a second block diagram of an active spread code detection system in accordance to an embodiment of the present invention.

FIG. 4a shows a block diagram of certain processes performed by an implementation of the active spread code detection module 330 of the present invention. In the process configuration of FIG. 4a, module 405 receives both the sorted code detection statistics, $\overline{CDS}$(k), and the corresponding sorted spread code indices, $\overline{SCI}$(k), for k=1:N where the sort is such that the amplitude of $\overline{CDS}$(k) is less than or equal to that of $\overline{CDS}$(k+1) for all k=1 to $\overline{N-1}$.

Module 410 determines an Activity Threshold based on the code detection statistics data. The Activity Threshold will be used to qualify individual sorted code detection statistics for possible spread code activity detection. An example method of determining the Activity Threshold is to take the mean, μ, and standard deviation, σ, of the smaller sorted code detection statistics defined by $\overline{CDS}$(k) for k=1 to N/2. This example method is indicated by module 410 in FIG. 4b. The Activity Threshold parameter can then be determined as Activity Threshold=μ+$K$*σ where, for example, the parameter K=2. The parameter K can also be empirically adjusted to improve the performance of the active spread code detection module. The Activity Threshold can also be determined from the unsorted code detection statistics, CDS(k). For example, the above equation for the Activity Threshold can be used where the mean, μ, and standard deviation, σ, is taken for the set of CDS(k) associated with spread codes having the maximum length spread factors, SF=SF$_{max}$.

Referring to FIG. 4a, module 420 determines the set of active codes, SCI_active, by testing each sorted code detection statistic, $\overline{CDS}$(m), and the corresponding sorted spread code index, $\overline{SCI}$(m), in the order of descending amplitude of the code detection statistic, i.e., from m=N to 1. Module 480 outputs the resultant set of active codes, SCI_active.

Figure 4B:
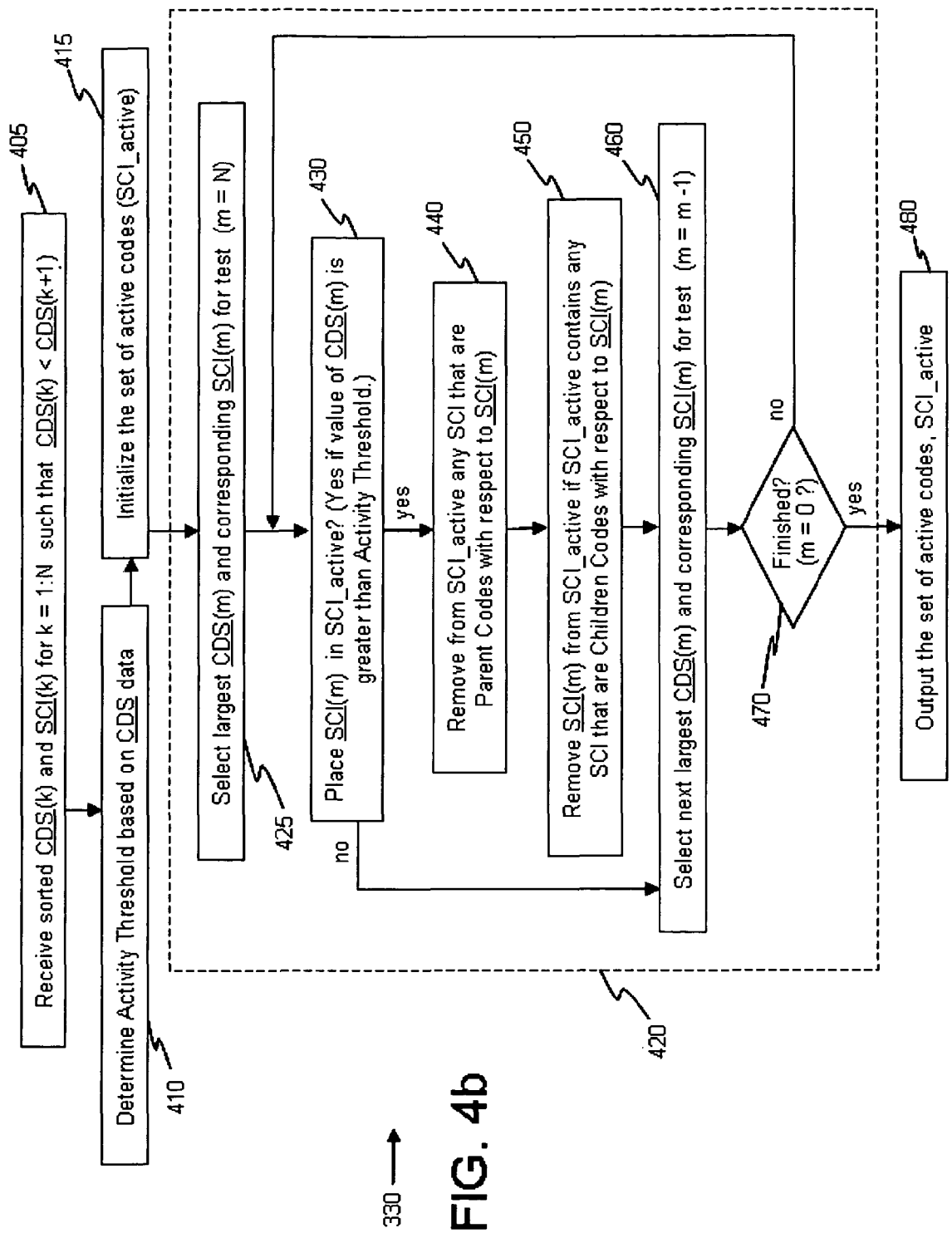

FIG. 4b shows a block diagram of certain processes performed by an implementation of the active spread code detection module 330 of the present invention. In comparison to FIG. 4a, FIG. 4b shows processes performed in module 420 that determine the set of active codes, SCI_active. FIG. 4b also shows a module 415 that initializes SCI_active.

If prior knowledge exists that one or more spread codes are active, the initialization module 415 can initialize the set of active codes, SCI_active, to the set of spread code indices that correspond to the known active codes. If there is no prior knowledge of spread code activity, or if the prior knowledge is not to be used, then module 415 initializes the set of active spread code indices, SCI_active, so that it is empty, i.e., so that SCI_active does not contain any spread code indices. It may be desirable to not use prior knowledge of spread code activity as a validation check on the prior knowledge versus the active spread code determination of the present invention.

In order to examine the sorted code detection statistics from largest amplitude to smallest amplitude, the processing/testing index m is initialized to N in module 425. This results in the first $\overline{CDS}$(m) and $\overline{SCI}$(m) pair tested being the pair that has the largest amplitude of $\overline{CDS}$, i.e., $\overline{CDS}$(m=N) is greater than or equal to all $\overline{CDS}$(k) for k=1 to $\overline{N-1}$. An iterative code detection statistic testing procedure is then started in module 430 where $\overline{CDS}$(m) is compared to the Activity Threshold from 410.

For example, if the first code detection statistic to be examined, $\overline{CDS}$(m=N), is less than or equal to the Activity Threshold, module 430 will not place the corresponding $\overline{SCI}$(m=N) in SCI_active and control transfers to module 460 which decrements m so that the next $\overline{CDS}$(m) and $\overline{SCI}$(m) pair tested in module 430 is for m=N−1 (control passing through module 470 and back to 430). Since in this example case $\overline{CDS}$(m) will be less than the Activity Threshold for all m=$\overline{N}$ to 1, no $\overline{SCI}$(m) will be placed in SCI_active and control will eventually transfer through module 470 to module 480 which will output the same SCI_active that was initialized in module 415. If in this example module 415 initialized SCI_active to an empty set, the active code determination module 330 will output an empty SCI_active set indicating that none of the N spread codes are active.

If the $\overline{CDS}$(m) that is being tested is greater than the Activity Threshold, module 430 places the corresponding $\overline{SCI}$(m) code index into the SCI_active set and control transfers control to module 440 where SCI_active is examined to determine if it contains any parent codes with respect to the $\overline{SCI}$(m). If any parent codes with respect to the $\overline{SCI}$(m) being tested are present, these parent codes are removed from SCI_active.

Control then transfers to module 450 which examines SCI_active to determine if it contains any children codes with respect to the $\overline{SCI}$(m) being tested. If any children codes of $\overline{SCI}$(m) are present, then $\overline{SCI}$(m) itself is removed from the SCI_active set. In either case, control subsequently transfers first to module 460, which decrements m, and then provided m is greater than zero, back to module 430 which brings in the next largest $\overline{CDS}$(m) and associated $\overline{SCI}$(m) for test. Module 470 stops the ordered testing of the sorted $\overline{CDS}$(m) and $\overline{SCI}$(m) data pairs once m reaches zero, at which point module 480 outputs the set of determined active codes, SCI_active.

Figure 4C:
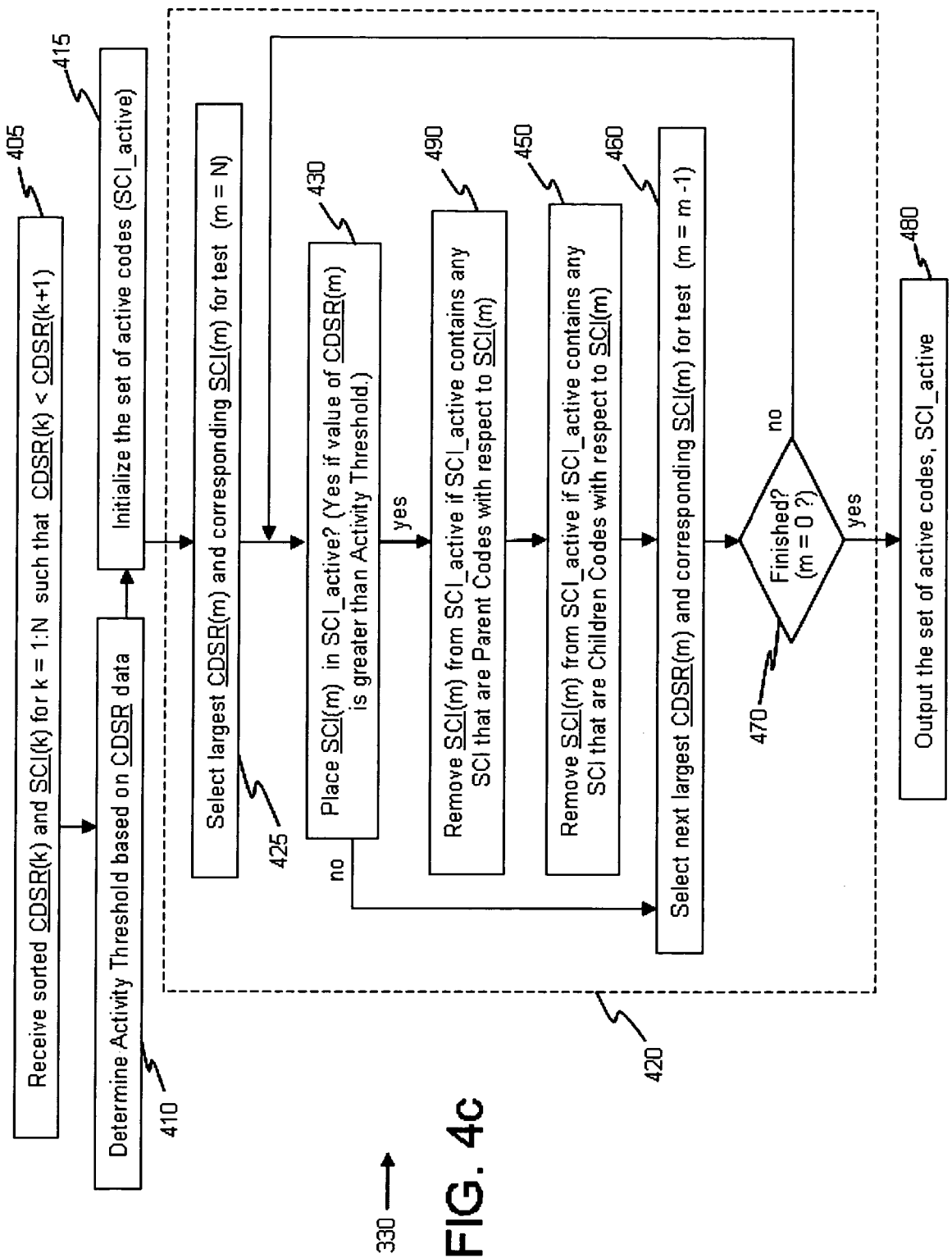

FIG. 4c shows a block diagram of certain processes performed by an alternative implementation of the modules 330 and 420 that determine the set of active codes, SCI_active, of the present invention. This alternative implementation is the preferred processing for the code detection statistic defined by the power ratio referred to as CDSR(k). In comparison to FIG. 4b, the module 440 of FIG. 4b has been replaced with module 490 of FIG. 4c. Module 490 also examines SCI_active to determine if it contains any parent codes with respect to the SCI(m) being tested. However, in module 490 if any parent codes of SCI(m) are present, then SCI(m) itself is removed from the SCI_active set.

This completes the description of the processing of modules 420 and 330 as well as the overall active code detection module 150 as drawn in FIGS. 1, 3 and 4 for example implementations of the present invention. The set of active codes, SCI_active, has been efficiently determined from the outputs of the N spread-code matched filters.

In one embodiment, a method for determining an active code set comprises (a) receiving code detection statistics and the corresponding spread code indices according to amplitudes of the code detection statistics, wherein the amplitudes of the code detection statistics monotonically increase with the probability that a spread code channel is active, (b) determining an activity threshold based on the received code detection statistics, (c) testing the code detection statistics and the corresponding spread code indices in descending order based on the amplitudes of the code detection statistics, the testing comprising: (i) placing a test spread code index, of the spread code indices being tested, in a spread code index active set when a value of the code detection statistic corresponding to the spread code index is greater than the activity threshold, (ii) removing a parent code index of the test spread code index from the spread code index active set when the parent code index is in the spread code index active set, (iii) removing the test spread code index from the spread code index active set when a child code index of the test spread code index is in the spread code index active set, (iv) performing steps (i) through (iii) until the value of the code detection statistic is not greater than the activity threshold, and (d) outputting the spread code index active set based on the testing. The method also comprises receiving symbol estimates from matched filters for the spread code indices prior to the receiving, and initializing the spread code index active set of any active spread codes prior to the testing, wherein the initializing comprises initializing the spread code index active set to an empty set, the initializing comprises initializing the spread code index active set to a known spread code index active set, wherein a Code Division Multiple Access (CDMA) signal utilizes the spread code channel.

Figure 5A:
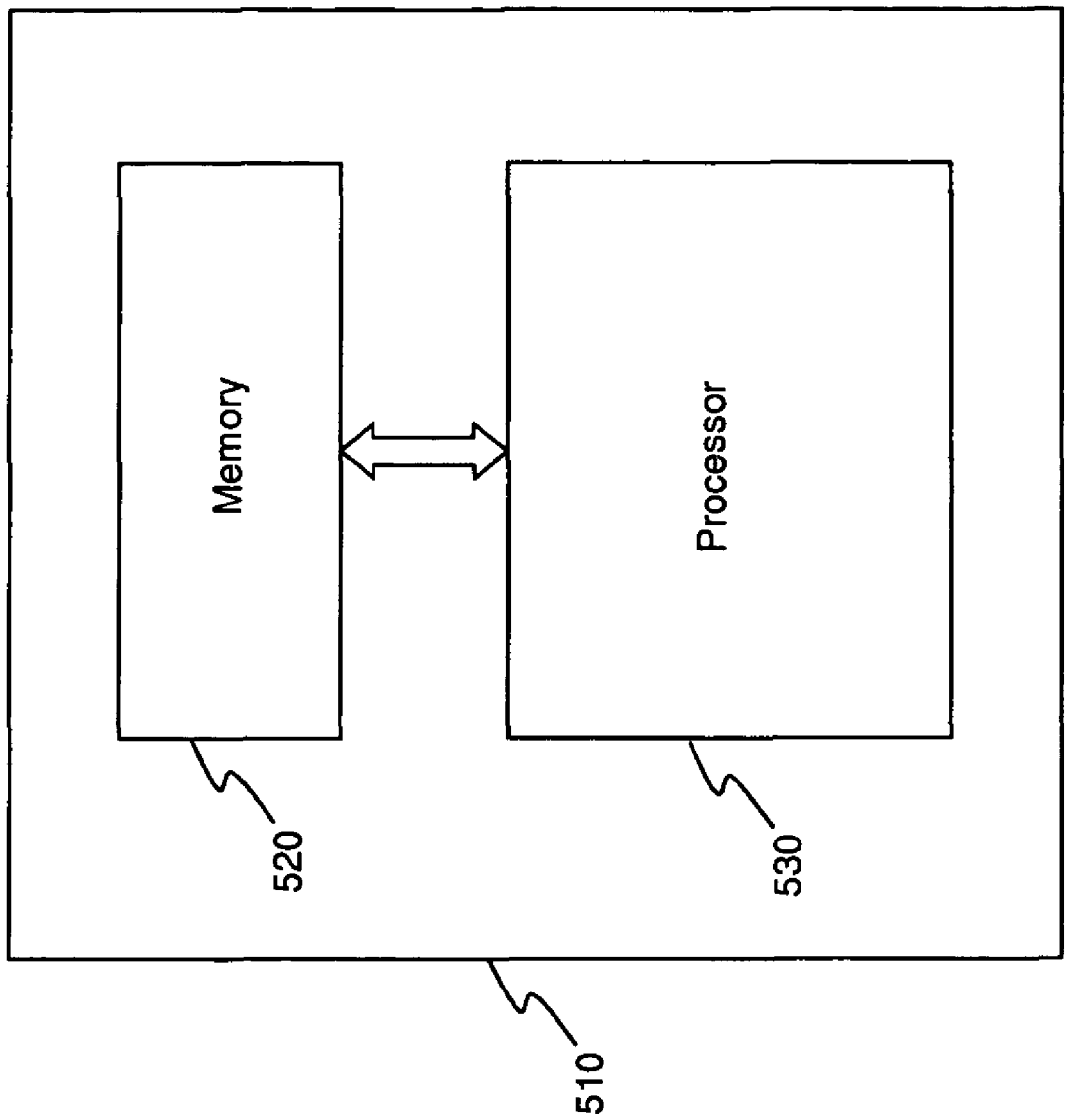
FIG. 5*a* depicts a device that can perform disclosed methods in accordance to an embodiment of the present invention.

FIG. 5*a* depicts a device 510 that performs any of the disclosed methods in accordance to an embodiment of the present invention. The device 510 includes a memory 520 communicably coupled to a processor 530. Although depicted as a direct connection, the connection between the memory 520 and the processor 530 can be via one or more elements (not depicted). The device 510 may be a single device, such as a wireless device or a device in a network, or may be a device within one or more of the depicted or described modules in FIGS. 1-4. The memory 520 can store the methods prior to the processor 530 performing such methods, can store information related to the methods, and can store any results from the processor's performance.

Figure 5B:
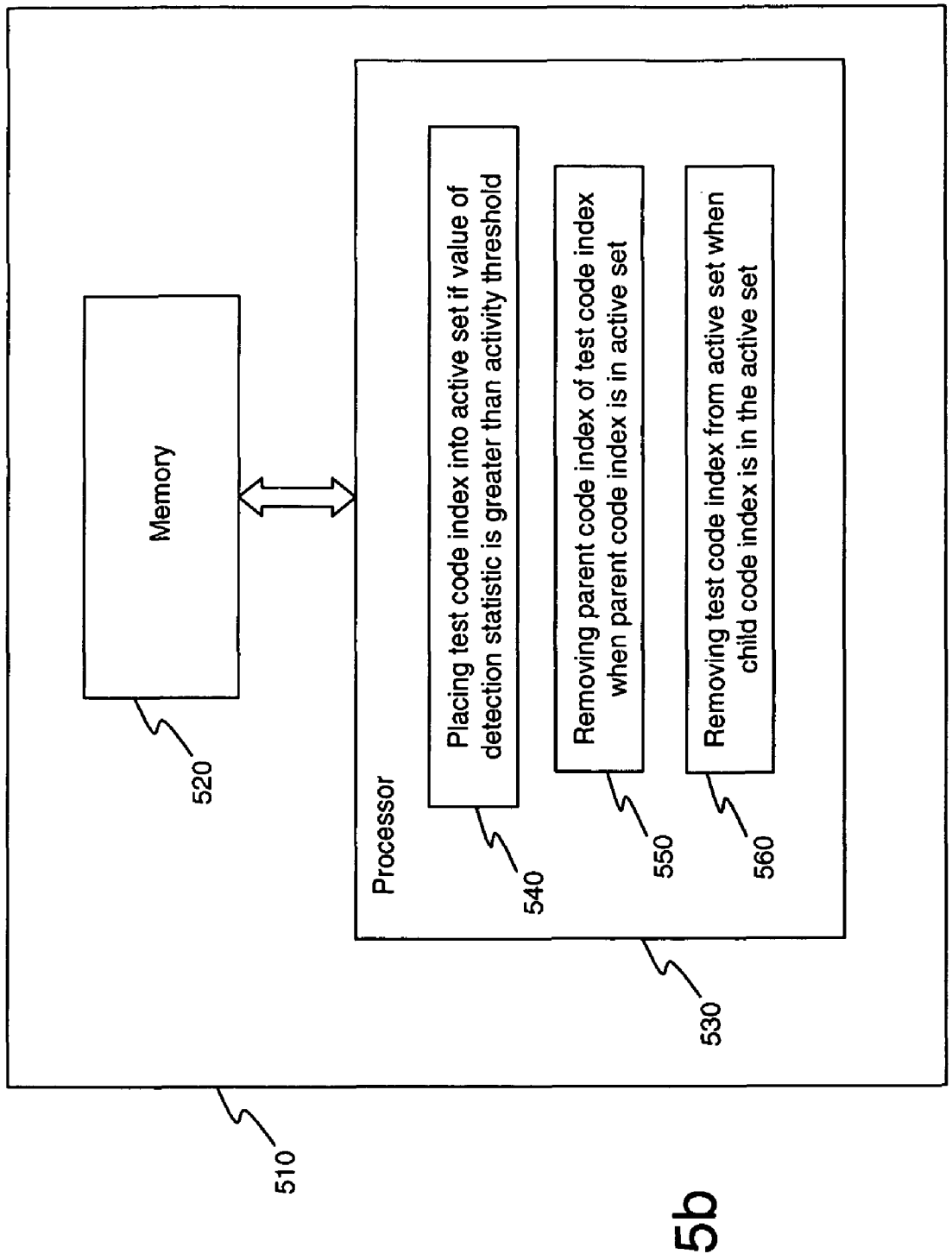
FIG. 5*b* depicts the device performing a disclosed method in accordance to an embodiment of the present invention.

FIG. 5*b* depicts the device 510 and the processor 530 that performs a disclosed method including placing a test code index into an active set if a value of a detection statistic is greater than an activity threshold at step 540, removing a parent code index of the test code index when the parent code index is in the active set at step 550, and removing the test code index from the active set when the child code index is in the active set at step 560. The memory 520 in FIGS. 5*a* and 5*b* can be any type of memory including Random Access Memory (RAM), Read Only Memory (ROM), a mass storage device, an optical storage device, a magnetic storage device, and the like. The memory 520 can also be configured as or used as primary storage, secondary storage, tertiary storage, off-line storage, and the like. The processor 530 in FIGS. 5*a* and 5*b* can be any type of processor including a microprocessor, a microcontroller, a mini controller, or any device that can execute a computer program (or a computer readable medium that comprises instructions). One or more of the memory 520 and the processor 530 can be utilized without departing from the scope of the current invention.

In one embodiment, an active code detection module for determining an active code set comprises a module that tests code detection statistics and corresponding spread code indices in descending order based on amplitudes of the code detection statistics, the tests: place a test spread code index, of the spread code indices being tested, in a spread code index active set when a value of the code detection statistic corresponding to the spread code index is greater than an activity threshold, remove a parent code index of the test spread code index from the spread code index active set when the parent code index is in the spread code index active set, and remove the test spread code index from the spread code index active set when a child code index of the test spread code index is in the spread code index active set. In the active code detection module, the module performs the tests until the value of the code detection statistic is not greater than the activity threshold, and the module outputs the spread code index active set based on the tests.

Figure 6A:
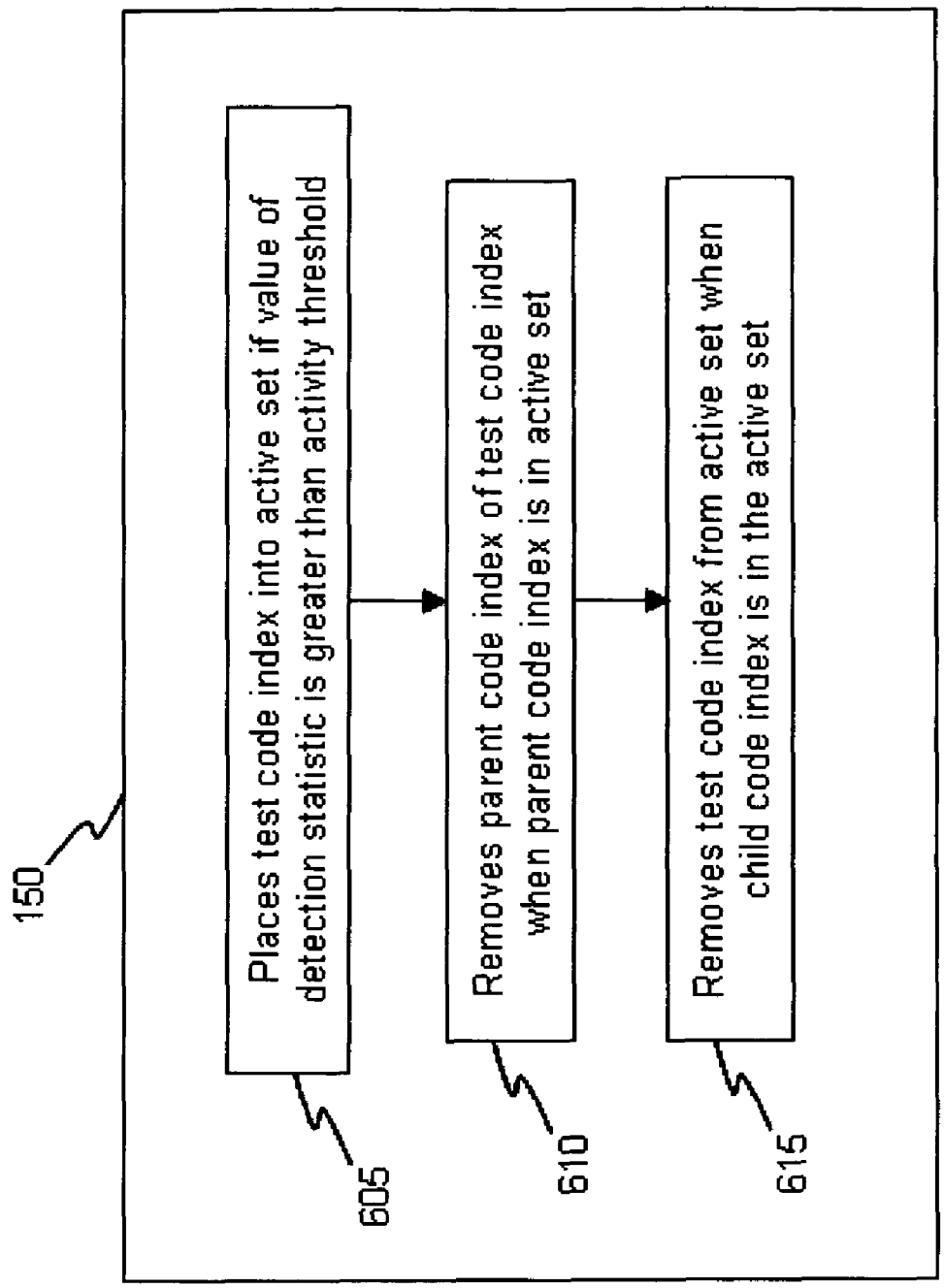
FIG. 6*a* depicts an active code detection module performing a disclosed method in accordance to an embodiment of the present invention.

FIG. 6*a* depicts an active code detection module 150 which can be arranged as it appears in FIG. 1 or can be combined with at least one of: the matched filters 140-144, and the channel selector 160 (not shown). The active code detection module 150 places a test code index into an active set if a value of a detection statistic is greater than an activity threshold at step 605, removes a parent code index of the test code index when the parent code index is in the active set at step 610, and removing the test code index from the active set when the child code index is in the active set at step 615.

Figure 6B:
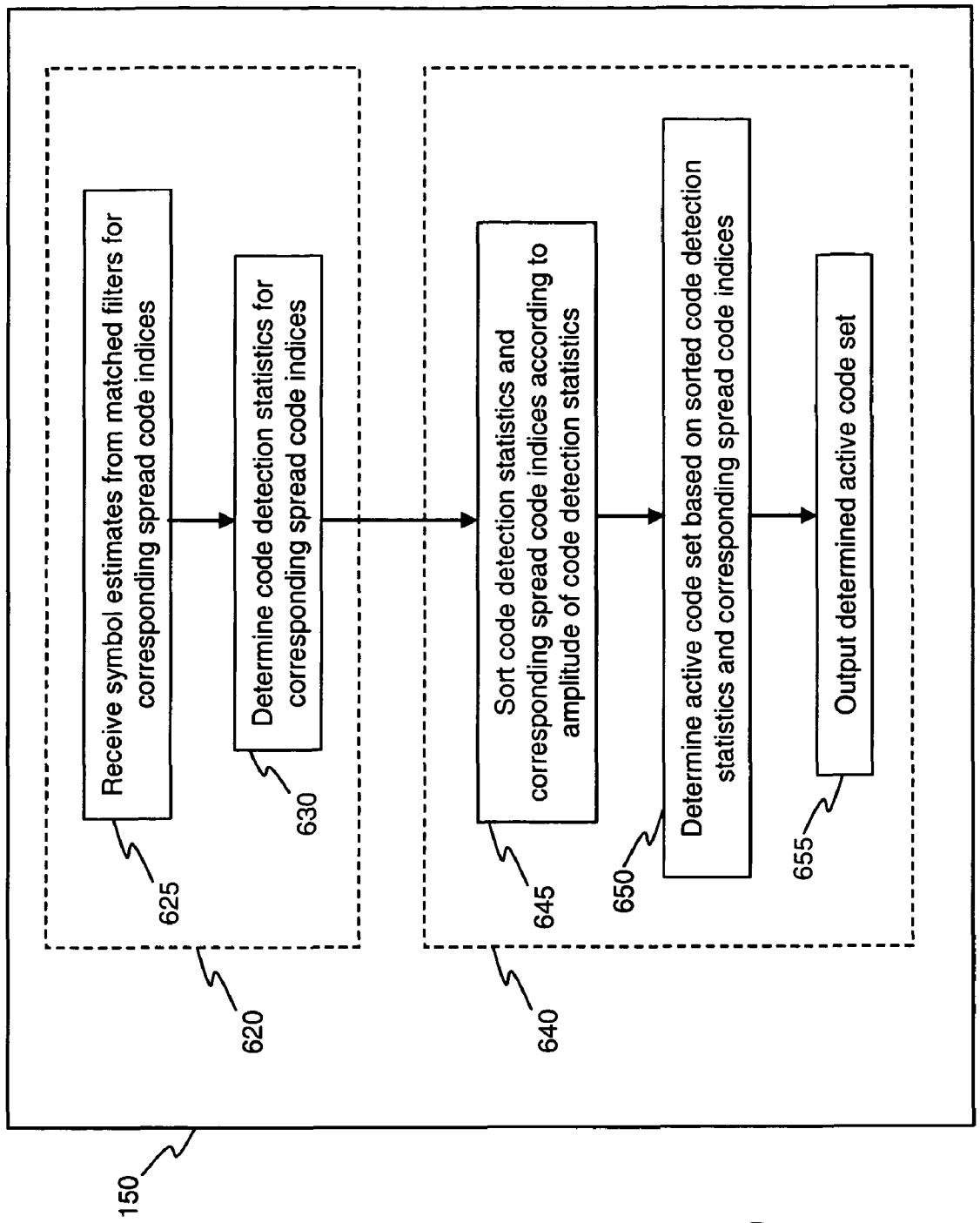
FIG. 6*b* depicts an active code detection module performing a plurality of disclosed methods in accordance to an embodiment of the present invention.

FIG. 6*b* depicts an active code detection module 150 that performs any of the disclosed methods in accordance to an embodiment of the present invention. In one embodiment, an active code detection module 150 for determining an active code set comprises: a first module 620 that: receives symbol estimates from matched filters for spread code indices at step 625, and determines code detection statistics for corresponding ones of the spread code indices at step 630, and a second module 640 that: sorts the determined code detection statistics and the corresponding spread code indices according to amplitudes, of the code detection statistics, that monotonically increase with the probability that a spread code channel is active at step 645, determines an active code set based on the sorted code detection statistics and the corresponding sorted spread code indices at step 650, and outputs the determined active code set at step 655. In the active code detection module 150 the determined active code set is output to a channel selector, wherein the channel selector selects active code channels from the active code set, wherein the channel selector outputs associated symbol estimates from the active code channels, and wherein, the associated symbol estimates are output for further processing in relation to at least one of: symbol decoding, and interference cancellation.

Although embodiments of the present invention have been illustrated in the accompanied figures and described in the foregoing detailed description, it will be understood that the invention is not limited to the embodiments disclosed, but is capable of numerous rearrangements, modifications, and substitutions without departing from the spirit of the invention as set forth and defined by the following claims. For example, the active spread code detection can be performed via hardware and/or software using a processor such as a Reduced Instruction Set Computer (RISC) or a Digital Signal Processor (DSP). Further, although depicted in a particular manner, more than one of the depicted or described modules can be utilized in the present invention and functionality provided by one module can be fully and/or partially provided by another one of the modules. Also, the transfer of information from one module to another module can be performed by a wired or a wireless connection.

What is claimed is:

1. A method for determining an active code set, comprising:
by an active spread code detection module:
(a) receiving code detection statistics and the corresponding spread code indices, wherein the amplitudes of the code detection statistics are proportional to the probability that a spread code channel is active;
(b) determining an activity threshold based on the received code detection statistics;
(c) testing the code detection statistics and the corresponding spread code indices in descending order based on the amplitudes of the code detection statistics, the testing comprising:
(i) placing a test spread code index, of the spread code indices being tested, in a spread code index active set when a value of the code detection statistic corresponding to the spread code index is greater than the activity threshold;
(ii) removing a parent code index of the test spread code index from the spread code index active set when the parent code index is in the spread code index active set;
(iii) removing the test spread code index from the spread code index active set when a child code index of the test spread code index is in the spread code index active set;
(iv) performing steps (i) through (iii) until the value of the code detection statistic is not greater than the activity threshold; and
(d) outputting the spread code index active set based on the testing.

2. The method of claim 1 comprising receiving symbol estimates from matched filters for the spread code indices prior to the receiving.

3. The method of claim 1 comprising initializing the spread code index active set of any active spread codes prior to the testing.

4. The method of claim 3, wherein the initializing comprises initializing the spread code index active set to an empty set.

5. The method of claim 3, wherein the initializing comprises initializing the spread code index active set to a known spread code index active set.

6. The method of claim 1, wherein a Code Division Multiple Access (CDMA) signal utilizes the spread code channel.

7. An active code detection module for determining an active code set, comprising:
a processor that tests code detection statistics and corresponding spread code indices in descending order based on amplitudes of the code detection statistics, wherein the tests:
place a test spread code index, of the spread code indices being tested, in a spread code index active set when a value of the code detection statistic corresponding to the spread code index is greater than an activity threshold;
remove a parent code index of the test spread code index from the spread code index active set when the parent code index is in the spread code index active set; and
remove the test spread code index from the spread code index active set when a child code index of the test spread code index is in the spread code index active set.

8. The active code detection module of claim 7, wherein the module performs the tests until the value of the code detection statistic is not greater than the activity threshold.

9. The active code detection module of claim 7, wherein the module outputs the spread code index active set based on the tests.

* * * * *